US008024770B2

(12) United States Patent
Fee et al.

(10) Patent No.: US 8,024,770 B2
(45) Date of Patent: Sep. 20, 2011

(54) TECHNIQUES FOR MANAGING SECURITY CONTEXTS (75) Inventors: Gregory D. Fee, Bellevue, WA (US);
Brian A. LaMacchia, Seattle, WA (US);
Blair Dillaway, Clyop Hill, WA (US)

(73) Assignee: Microsoft Corporation, Redmond, WA (US)

( * ) Notice: Subject to any disclaimer, the term of this patent is extended or adjusted under 35 U.S.C. 154(b) by 1090 days.

(21) Appl. No.: 11/471,905

(22) Filed: Jun. 21, 2006

(65) Prior Publication Data

US 2007/0300285 A1 Dec. 27, 2007

(51) Int. Cl.
*H04L 9/00* (2006.01)
*H04L 9/32* (2006.01)
*G06F 7/04* (2006.01)

(52) U.S. Cl. .......... 726/1; 726/27; 726/28; 726/29; 726/30; 726/2; 726/3; 726/4; 726/5; 726/6; 713/182; 713/183; 713/184; 713/185; 713/186

(58) Field of Classification Search .......... 726/1
See application file for complete search history.

(56) References Cited

U.S. PATENT DOCUMENTS

| 5,852,666 | A | 12/1998 | Miller et al. | |
| 5,915,085 | A * | 6/1999 | Koved | 726/1 |
| 6,226,746 | B1 * | 5/2001 | Scheifler | 726/1 |
| 6,574,736 | B1 | 6/2003 | Andrews | |
| 6,604,198 | B1 | 8/2003 | Beckman et al. | |
| 6,606,711 | B2 | 8/2003 | Hill et al. | |
| 6,986,060 | B1 | 1/2006 | Wong | |
| 7,516,446 | B2 * | 4/2009 | Choi et al. | 717/128 |
| 7,546,629 | B2 * | 6/2009 | Albert et al. | 726/1 |
| 2002/0059503 | A1 * | 5/2002 | Dennie | 711/153 |
| 2002/0066051 | A1 * | 5/2002 | Hobson et al. | 714/16 |
| 2002/0073320 | A1 * | 6/2002 | Rinkevich et al. | 713/183 |
| 2002/0107875 | A1 | 8/2002 | Seliger et al. | |
| 2004/0250125 | A1 | 12/2004 | Janson et al. | |
| 2006/0015728 | A1 | 1/2006 | Ballinger et al. | |
| 2006/0095910 | A1 * | 5/2006 | Norton et al. | 718/100 |
| 2007/0234326 | A1 * | 10/2007 | Kejariwal et al. | 717/151 |

FOREIGN PATENT DOCUMENTS

WO    WO9850843 A1    11/1998
WO    WO0199030 A3    12/2001

* cited by examiner

*Primary Examiner* — Longbit Chai (57) ABSTRACT

Techniques for managing security contexts may be described. An apparatus may comprise a processor and a security management module. The security management module may form a merged security context for multiple concurrent threads, with one of the threads depending on more than one preceding operation from other threads. Other embodiments are described and claimed.

16 Claims, 6 Drawing Sheets

TECHNIQUES FOR MANAGING SECURITY CONTEXTS

BACKGROUND

Security is becoming an increasing concern for many reasons, not the least of which is the prevalence of networking and communications technologies making software programs remotely accessible. Traditional security enforcement models were built primarily to provide correct program isolation and access control restrictions primarily based on sequential program execution flow. In this model, a single execution security context is typically adequate as a basis for all security decisions for the executing program. This simple model has been extended to handle asynchronous operations, primarily to deal with slow data input/output (I/O) or to handle multiple independent network requests to a service. In these systems, it is fairly straightforward to create an independent security context on a new execution thread.

Software programs and the underlying hardware platforms used to execute software programs, however, are becoming increasingly complex and may use programming and execution techniques which create highly dynamic interactions between relatively short sequential execution program fragments. Such software programs may use static or dynamic scheduling of tasks onto concurrent processing threads in order to take advantage of multiple processors. This results in the security context for a program fragment potentially depending on the security contexts from multiple independent execution threads. Accordingly, there may be a need for improved security enforcement techniques to accommodate these and other new programming and execution paradigms.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments may be generally directed to security enforcement techniques for software applications. One embodiment may comprise, for example, a processor and a security management module. The security management module may be arranged to form a merged security context based on input from multiple concurrent threads, with one of the threads depending on more than one preceding operation from other threads. The merged security context may be formed using one or more security contexts from one or more of the multiple threads. The security contexts may be formed in accordance with various security enforcement models, such as a security token technique, a managed security principal technique, a code-based permissions technique, and so forth. For example, the merged security context may be formed by taking an intersection of entities and permissions, a union of entities and permissions, using one of the security contexts from a given thread, or some combination thereof. Other embodiments are described and claimed.

DETAILED DESCRIPTION

Various embodiments may be generally directed to security enforcement techniques for software applications. Modern software applications may need to execute multiple operations concurrently on different execution threads but have synchronization points with operations dependent on the results from two or more concurrently executing operations. Each thread may have a different security context that may include, for example, an entity identifier and set of permissions. A problem may arise, however, when attempting to select and merge the various security contexts. Security enforcement models designed for sequential program execution may not necessarily apply to concurrent program execution environments.

Various embodiments may address these and other problems by providing an application runtime environment to properly flow and merge security contexts when synchronizing the results of multiple concurrent operations. Various embodiments may address operating system (OS) level account-based security and allow proper use of impersonation semantics. Various embodiments may also handle flow and merging of code-based permissions. Security enforcement models suitable for use with some embodiments may include security tokens used by one or more variants of MICROSOFT® WINDOWS® OS, the Microsoft Common Language Runtime (CLR) virtual machine environment, and applications developed using the Microsoft Concurrency and Coordination Runtime (CCR) concurrency libraries, among others. The embodiments are not limited in this context.

Figure 1:
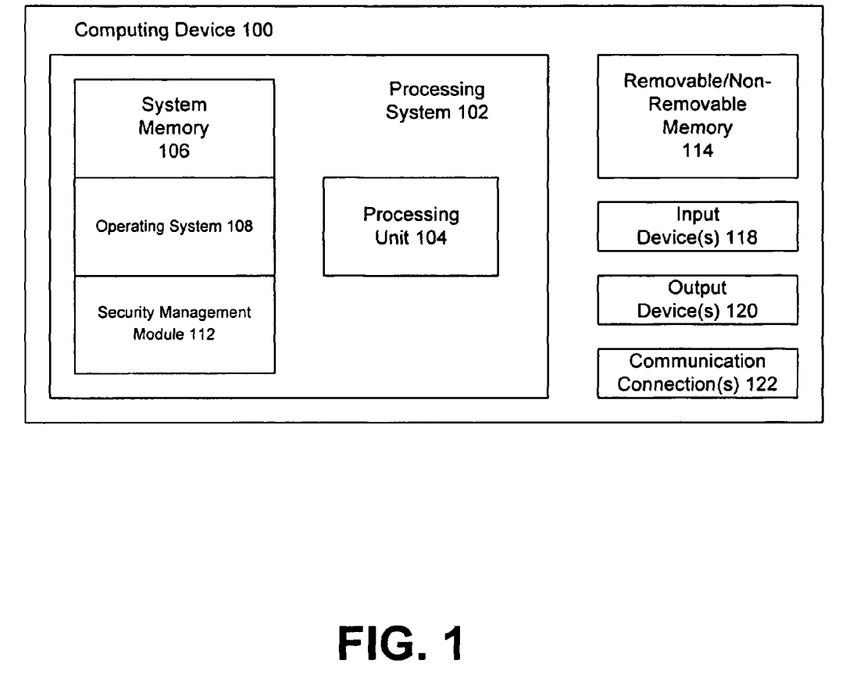
FIG. 1 illustrates an exemplary embodiment of a computing device.

FIG. 1 illustrates a block diagram for a computing device 100. Computing device 100 may represent a general system architecture suitable for implementing various embodiments. Computing device 100 may comprise multiple elements. An element may comprise any physical or logical structure arranged to perform certain operations. Each element may be implemented as hardware, software, or any combination thereof, as desired for a given set of design parameters or performance constraints. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software may include any software components, programs, applications, computer programs, application programs, system programs, machine programs, operating system software, middleware, firmware, software modules, routines, subroutines, functions, methods, interfaces, software interfaces, application program interfaces (API), instruction sets, computing code, computer code, code segments, computer code segments, words, values, symbols, software objects, or any combination thereof. Although computing device 100 as shown in FIG. 1 has a limited number of elements in a certain topology, it may be appreciated that computing device 100 may include more or less elements in alternate topologies as desired for a given implementation. The embodiments are not limited in this context.

In various embodiments, computing device 100 may be implemented as part of a target device. Examples of target devices may include, but are not limited to, a computer, a computer system, a computer sub-system, a workstation, a terminal, a server, a web server, a virtual server, a personal computer (PC), a desktop computer, a laptop computer, an ultra-laptop computer, a portable computer, a handheld computer, a personal digital assistant (PDA), a mobile computing device, a cellular telephone, a media device (e.g., audio device, video device, text device, and so forth), embedded device, and any other electronic, electromechanical, or electrical device. The embodiments are not limited in this context.

In various embodiments, computing device 100 typically includes a processing system of some form. In its most basic configuration, computing device 100 may include a processing system 102 having at least one processing unit 104 and system memory 106. Processing unit 104 may include one or more processors capable of executing software, such as a general-purpose processor, a dedicated processor, a media processor, a controller, a microcontroller, an embedded processor, a digital signal processor (DSP), and so forth. System memory 106 may be implemented using any machine-readable or computer-readable media capable of storing data, including both volatile and non-volatile memory. For example, system memory 106 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information.

As shown in FIG. 1, system memory 106 may store various software programs, such as one or more operating systems (OS) 108 and accompanying data. An OS is a software program that manages the hardware and software resources of a computer. An OS performs basic tasks, such as controlling and allocating memory, prioritizing the processing of instructions, controlling input and output devices, facilitating networking, managing files, and so forth. Examples of OS 108 may include one or more variants of MICROSOFT® WINDOWS®, as well as others.

Computing device 100 may also have additional features and/or functionality beyond processing system 102. For example, computing device 100 may have one or more flash memory units 114. In another example, computing device 100 may also have one or more input devices 118 such as a keyboard, mouse, pen, voice input device, touch input device, and so forth. In yet another example, computing device 100 may further have one or more output devices 120, such as a display, speakers, printer, and so forth. In still another example, computing device 100 may also include one or more communications connections 122. It may be appreciated that other features and/or functionality may be included in computing device 100 as desired for a given implementation.

In various embodiments, computing device 100 may further include one or more communications connections 122 that allow computing device 100 to communicate with other devices. Communications connections 122 may include various types of standard communication elements, such as one or more communications interfaces, network interfaces, network interface cards (NIC), radios, wireless transmitters/receivers (transceivers), wired and/or wireless communication media, physical connectors, and so forth. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media. The terms machine-readable media and computer-readable media as used herein are meant to include both storage media and communications media.

In various embodiments, computing device 100 may further include one or more memory units 114. Memory unit 114 may comprise any form of volatile or non-volatile memory, and may be implemented as either removable or non-removable memory. Examples of memory unit 114 may include any of the memory units described previously for system memory 106, as well as others. The embodiments are not limited in this context.

In various embodiments, processing system 102 may include a security management module 112. Security management module 112 may be arranged to manage and implement various security enforcement models and techniques for one or more application programs executed by processing system 102, or some other device. More particularly, security management module may select and merge security contexts in a safe and reliable manner. They will also detect attempts to merge incompatible or inconsistent security contexts and generate an error report. This may allow a more flexible set of concurrent programming constructs that are likely to increase in relevance over time as programming techniques and computing infrastructure increase in complexity.

An aspect of all security enforcement models is the security context. The nature of the context varies between security enforcement models as they concern themselves with different actors (often called principals), different resources, and different policies. The security context typically includes a representation of some form of the principal. For instance, in a security model that has principals that are people and resources that are cookies, an instance of a security context might state that the current user is "Greg." On an attempt to get a cookie, the security engine would get the current context to learn that the principal concerned is Greg. In order to make an authorization decision, the security engine checks against a policy. In this case the policy might take the form of "Brian and Blair are allowed to get cookies; Greg is not allowed to get cookies." Therefore, when the engine matches the principal "Greg" that it received from the context against this policy, the engine will deny access.

Program execution that depends on multiple preceding concurrent operations can complicate security context tracking. One common manner of expressing operation concurrency is as program threads. This construct provides sequential program execution, which simply means that the current operation is a direct result of the previous operation. Many security systems track security context in a way that assumes this type of sequential execution.

Another common manner of expressing operation concurrency is as a partial ordering. In such a system, each operation is annotated with a set of operations which must complete before it starts. For instance, for a set of operations {A . . . D}, the partial ordering may be that A must precede B which must precede C and D. When this set of operations is executed, the system will guarantee that B completes before C or D begins. The relative ordering of C and D, however, is undefined meaning that the system may execute C before D, D before C, or C and D simultaneously at its discretion. Note that in this example ordering each operation is proceeded by exactly one operation. This allows a simple mapping to threads and processes, thus allowing a simple mapping of thread-based security context tracking.

In some cases, partial ordering allows for more than one preceding operation. For instance, for a set of operations {A, B, C}, the partial order may be that A and B must precede C. In this system A and B can run in any order including simultaneously. When both have completed, C is allowed to begin. This system does not have a straightforward mapping to threads since C could run on A's thread, B's thread or some third thread. A system with multiple predecessors may be described with reference to FIG. 2.

Figure 2:
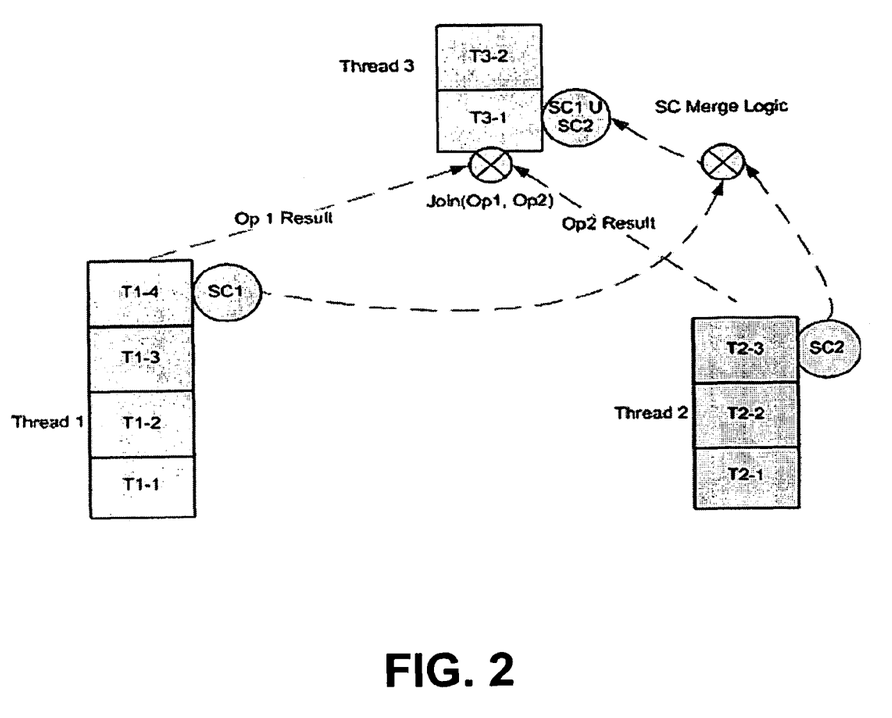
FIG. 2 illustrates an exemplary embodiment of concurrent operations.

FIG. 2 illustrates an exemplary embodiment of concurrent operations. Software programs and the underlying hardware platforms used to execute software programs are becoming increasingly complex. For example, software programs may use concurrent processing threads and computing platforms may use multiple processors. It is becoming far more common for applications to run operations concurrently in order to take advantage of multiple processors. In such an environment, application programs often need to execute multiple operations concurrently on different execution threads but have synchronization points with operations dependent on the results from two or more concurrently executing operations.

As shown in FIG. 2, two concurrently executing sets of operations may be represented as Thread 1 and Thread 2. A third set of operations may run on Thread 3 (or one of the other Threads 1 and/or 2 when the results of the first two concurrent operations are available. Each thread may represent a call stack representing the flow of execution through a series of program subroutines. The active subroutines are those which have been called but have not yet completed execution by returning. This kind of stack is also known as an execution stack, control stack, or function stack. Each call stack may be composed of multiple stack frames, sometimes referred to as activation records. Each stack frame corresponds to a call to a subroutine which has not yet terminated with a return. For example, Thread 1 may have stack frames T1-1 through T1-4, Thread 2 may have stack frames T2-1 through T2-3, and Thread 3 may have stack frames T3-1 through T3-2.

Each of Threads 1 and 2 may have its own security context. For example, Thread 1 may have a security context SC1 while Thread 2 may have a security context SC2. During execution of Threads 1 and 2, any given stack frame may change SC1 and SC2, respectively.

At this point in execution, security management module 112 should determine a correct security context for Thread 3 based on the security contexts corresponding to Threads 1 and 2. Existing systems have provided little help in establishing the correct security context to start operation 3. Security management module 112 attempts to merge SC1 and SC2 to produce a usable and logically correct security context SC3. In general it is not guaranteed that such an SC3 can be produced and the system should detect this and raise an appropriate error. Furthermore, it is generally not possible for the application developer to deal with this issue. First, in concurrent programming environments based on asynchronous message passing such as the Microsoft developed Common Currency Runtime, any OS security context information associated with the messages may not be accessible to the application code. Even if it is accessible, the typical program may not have sufficient privileges to directly modify their own security context as this would undermine the OS security mechanism. Finally, in modern systems with multiple types of security context information (e.g., such as authenticated operation requestor tokens and code-based security data such as that maintained in CLR Code Access Security (CAS) permissions or in the Java security system), there has been no model for how to properly merge multiple security contexts.

Security manager module 112 addresses these problems by providing an application runtime environment to properly flow and merge security contexts when synchronizing the results of multiple concurrent operations. Security manager module 112 addresses OS level account-based security and allows proper use of impersonation semantics. Security manager module 112 also handles flow and merging of code-based permissions.

Partial operation ordering requires security context merging. In the previous example, there are two operations, A and B, which must precede a third operation, C. Each of the preceding operations may contribute to the security context. Therefore, the security context in C is a function of the security contexts in A and B. For instance, going back to the cookie security system example let C be an operation that requires that two people must jointly ask for a cookie. Also let operations A and B have security contexts that name Brian and Greg, respectively, as the requestors of the cookie. The merged security context to use for C should include both requestors. If the authorization decision in C only looks at one of the requesters, it is possible that Greg may get a cookie even though the policy states that he should not. The authorization decision in C must examine all the requesters in order to guarantee that everyone is allowed a cookie. That is to say that the security context C is not the security context from A or B. Instead it is created by merging information from both.

The semantics of merging contexts vary between security enforcement models. In the previous example, it was necessary to alter the security model in two ways to support context merging. First, the security context changed from containing a single identity to containing a list of identities. Second, the authorization algorithm changed to allow access only when all identities in the context are allowed access. In another security model, the security context could contain permission information. In that model, merging security contexts could be taking the intersection of permissions. Comparing this to the cookie security system from above, the security context changes from containing an identity (e.g. "Brian"), to including a permission, such as "allowed to get a cookie." An equivalent of the security context that includes Greg would be an empty security context, meaning that the executing code associated with the context is not allowed to get a cookie. Merging the three contexts from above would be the intersection of "allowed to get a cookie," and the empty set, which yields the empty set. The authorization algorithm for security management module 112 in computing device 100 then checks the context to see if the associated executing code is allowed to get a cookie.

In general, an "intersection" operation (represented by the symbol "∩") is a set operation that yields the common elements of the operand sets. For example, if Set1 includes elements A, B, and C, and Set2 includes elements B, C, and D, then the intersection of Set1 and Set2 (e.g., Set1∩Set2) equals B and C. In contrast, a "union" operation (represented by the symbol "∪") is a set operation that yields all elements in the operand sets (i.e., the non-duplicative aggregation of all the elements in the sets). For example, if Set1 includes elements A, B, and C, and Set2 includes elements B, C, and D, then the union of Set1 and Set2 (e.g., Set1∪Set2) equals A, B, C and D.

Security management module 112 may be implemented for various types of security enforcement models. Examples of implementations for three security enforcement models may be described with reference to FIGS. 3-5, although security management module 112 may be modified to accommodate other security enforcement models as desired for a given implementation. The first security enforcement model is an OS account-based security tokens such as WINDOWS security tokens. The second enforcement model is managed security principals, which may not necessarily map directly to an OS account. The third security enforcement model is code-based permissions such as provided by the CLR CAS system or Java permissions. In one embodiment, a security context contains information for all three security enforcement models. Each security enforcement model, however, has a unique semantic and therefore those described use merging semantics that are generally separate and orthogonal. Each merging semantic for each model will be described separately as follows.

Merging Windows Security Tokens

Windows security tokens represent system accounts. Each token represents an entity (most often a user) as a security identifier (SID) plus a set of groups that the entity belongs to as a list of SIDs. The security context is a tuple that contains a token representing the process owner and optionally a token on the thread. In most cases, if the optional thread token is present it is used when performing security checks; otherwise the process token is used. To perform an access check, the security engine examines the access control list (ACL) associated with the resource. Access is allowed if there is an entry that allows the action for the user or one of the groups specified by the token and there are no entries that explicitly deny the action for the user or one of the groups specified.

There are a many different ways to combine WINDOWS security token contexts. For example, one way is to guarantee that all input security contexts are equivalent. If you assume that all the security contexts are from the same process, equivalency depends only on the thread token. As such, two security contexts are equivalent if neither includes a thread token or if both include a thread token for the same entity with the same set of groups enabled. If all security contexts in a merge prove equivalent in this manner, no real merge is needed. Instead the merged security context may comprise any one of the input security contexts. If the security contexts are not equivalent, the join operation fails. If security contexts are from different processes, equivalency of the security contexts must also include equivalency of the process tokens. In this case, all of the process tokens for the input security contexts must represent the same entity with the same set of groups enabled.

Another way to combine WINDOWS security token contexts is to create merged security tokens. In this methodology, the technique should produce a new token that has equivalent or lesser permissions than the intersection of permissions granted to the input tokens. In this technique, all input tokens should represent the same entity. The merged security token is then produced using that same user plus the groups that are enabled for all of the input tokens (e.g., the intersection of groups enabled across the input tokens). In this technique, when merging a security context without a thread token the process token should instead be used.

Merging Managed Security Principals

Managed security principals can represent any type of entity. Managed security principals may refer to, for example, security principals inside the CLR. The only requirement of managed security principals is that their implementation must support the IPrincipal interface as defined in the System.Security.Principal namespace of the Microsoft Net Framework. Principals are attached to threads where they can be accessed to perform security checks. The nature of the security check is not defined or constrained by the rest of the system. There are at least two ways to merge managed security principals. One technique is to guarantee the equivalency of all of the input principals as defined by their overload of the Object.Equals method. Another technique is to extend the IPrincipal interface to include a merge operation. This operation would take an IPrincipal as a parameter and return an IPrincipal that represents the merging of the parameter and the "this" IPrincipals. The semantics of equality and merge are specific to the type of principal.

Merging CAS Contexts

A CAS security context may contain executable code permissions. The security context is logically a stack of permissions which correspond to the thread stack of executing code. A security check is performed by ensuring that the permission corresponding to the resource is contained in the permissions for all of the code in the stack. The context may also contain stack modifiers that alter the behavior of the security check. The most interesting modifier for this discussion is the "assert" modifier, also referred to as "asserting a permission." This modifier can terminate the stack walk during a security check or modify the permissions used subsequently during the stack walk.

Merging CAS contexts can be a straightforward logical operation. A security context that represents the merging of a set of contexts can be that set. The security check then verifies that each context within the merged context passes the security check as described above. This solution, however, is not ideal as the security contexts can be quite large and even the security check on a single stack of permissions can be prohibitively expensive.

CAS contexts can also be merged using compressed stacks. Compressed stacks are a technology that ships as part of the CLR application. In the CLR application, compressed stacks are used to move code access security contexts between threads on operations like creating a new thread or posting a work item to the thread pool. There are at least two techniques for combining CAS security contexts using compressed stacks. The first technique is more flexible but requires changing the existing compressed stack logic. In this technique, if none of the input CAS security contexts contain a permission assert stack modifier, the contexts can be appended into a compressed stack in any order. If one or more of the contexts contain an assert modifier, however, then the compressed stack should be formed by appending the stack permission information that appears before the assert modifier for all of the contexts. Finally, each of the assert stack modifiers and subsequent permission should be independently appended to the compressed stack. The evaluation algorithm for the compressed stack then needs to be modified to handle the independent assert and permission chains.

Another technique for combining CAS security contexts using compressed stacks requires no changes to the existing compressed stack mechanism. If there are no asserts, this mechanism operates identically to the previous mechanism. If one or more of the contexts contains an assert, this mechanism requires that at most one of the asserts is for less than full trust. If this condition is satisfied, the compressed stack should be formed by appending the stack permission information that appears before the assert for all of the contexts. Then the less than full trust assert and following permissions are appended.

Figure 3:
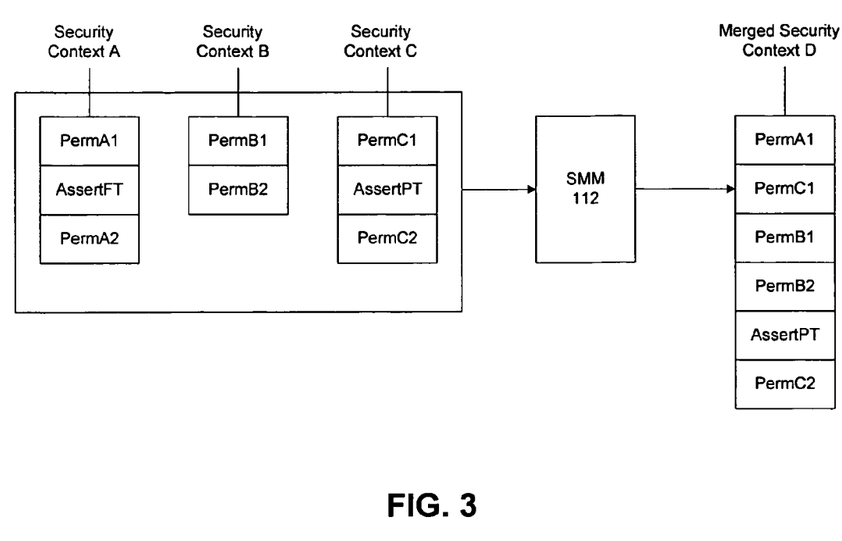
FIG. 3 illustrates an exemplary embodiment of a first merge operation.

FIG. 3 illustrates an exemplary embodiment of a first merge operation. As shown in FIG. 3, assume there are three CAS security contexts to merge represented as security contexts A, B and C. Only security context C contains a non-full trust assert (e.g., AssertPT). Security context A contains a full trust assert (e.g., AssertFT) and security context B contains no assert. Therefore, it is valid to merge these security contexts. Security management module 112 may take security contexts A, B and C as inputs, and output a merged security context D. Security management module 112 may form merged security context D by initially appending the stack permission information that appears before the asserts. For security context A that is PermA1. For security context B where there is no assert, it is all the permissions, namely PermB1 and PermB2. For security context C it is PermC1. Subsequently the less than full-trust assert (e.g., AssertPT) and following permissions are appended. The less than full-trust assert is in security context C and therefore AssertPT and PermC2 are appended to the merged security context D. It may be appreciated that although FIG. 3 shows a A1-C1-B1-B2 order, other orders of stack frames before the assert permissions may also be possible, including A1-B1-B2-C1 and other variants, as desired for given implementation.

Alternatively, the above-described technique could guarantee that all of the asserts form a subset ordering. That is that if there are three asserts in the input security contexts, it is possible to assign them labels A, B, and C such that A is a subset of B which is a subset of C. If this is the case, the compressed stack should be formed by appending the stack permission information that appears before the assert for all of the contexts. Next, the smallest assert set (e.g. label A) and the permissions following it are appended to the compressed stack. Each progressively larger assert set and the permission following it are then appended.

Figure 4A:
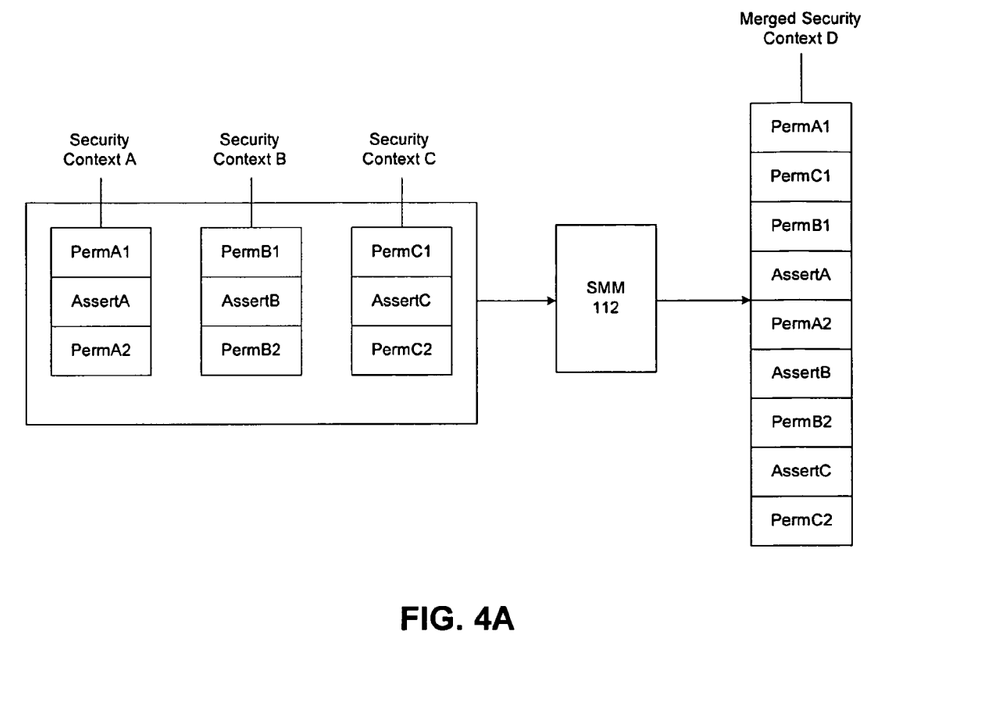
FIG. 4A illustrates an exemplary embodiment of a second merge operation.

FIG. 4A illustrates an exemplary embodiment of a second merge operation. Similar to FIG. 3, FIG. 4A illustrates three CAS security contexts to merge represented as security contexts A, B and C. In this case, all three contexts contain an assert. Further, AssertA is a subset of AssertB which is a subset of AssertC. Therefore, it is valid to merge these contexts. Security management module 112 may take security contexts A, B and C as inputs, and output a merged security context D. Security management module 112 may initiate merging the various security contexts by appending the stack permission information that appears for the asserts. Each context contributes one permission set in this stage, which includes PermA1, PermB1, and PermC1, respectively. Then the asserts and following permissions are inserted in the order of smallest to largest. Therefore AssertA and PermA2 are appended first. Following that are AssertB and PermB2, followed finally by AssertC and PermC2.

In some embodiments, individual stacks may contain multiple asserts and that the above mechanism may be applied to this scenario by evaluating subsequent asserts on a single stack as those that include the union of previous asserts. This alternative may be described in more detail with reference to FIG. 4B.

Figure 4B:
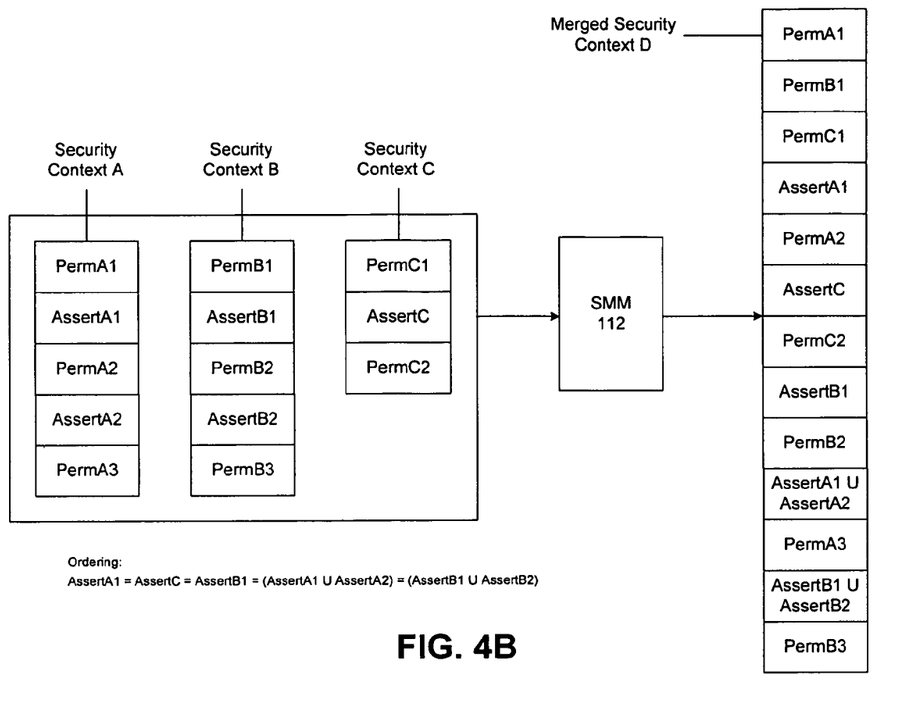
FIG. 4B illustrates an exemplary embodiment of a variant second merge operation.

FIG. 4B illustrates an exemplary embodiment of this variant of a second merge operation. As in FIG. 4, FIG. 4A illustrates three CAS security contexts to merge represented as security contexts A, B and C. Security contexts A and B contain multiple asserts (AssertA1 and AssertA2 in security context A and AssertB1 and AssertB2 in security context B), while security context C contains a single assert AssertC. When combining these asserts into the single stack for merged security context D, AssertA2 may be treated as though it contains the union of its own content as well as AssertA1 for ordering purposes. Similarly, AssertB2 may be treated as though it contains the union of its own content as well as AssertB1 for ordering purposes. This technique may be extended to handle any number of asserts in a single security context stack. For example, if the stack for security context A contained ordered asserts, A1, A2, and A3, for purposes of the subset order above they would be evaluated as A1, A1∪A2, and A1∪A2∪A3. Further note that if either of the two constraints for this second technique is met, it can be applied in the first technique to improve performance.

In various embodiments, security management module 112 may selectively choose security contexts that can be merged. As previously noted it may not always be possible to merge certain security contexts. In such cases, security management module 112 may choose to fail and not execute the operation that requires the merged context. Another possibility is that security management module 112 may choose operations to join based on the compatibility of the security contexts for merging. For example, referring again to the partial ordering system that requires operations A, B, and C to run before D. In a running instance of the partial ordering system, Blair, Brian and Greg are all executing operations A, B, and C. Normally, whenever there is a set of completed A, B, and C operations the system would choose to execute D. It is also possible, however, that the system could wait for a set of completed A, B, and C operations which include security contexts that can be merged. If in this system the only security contexts that can be merged are those with the same user, which would mean the system would wait for a completed A, B, and C all from the same user before executing D.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 5:
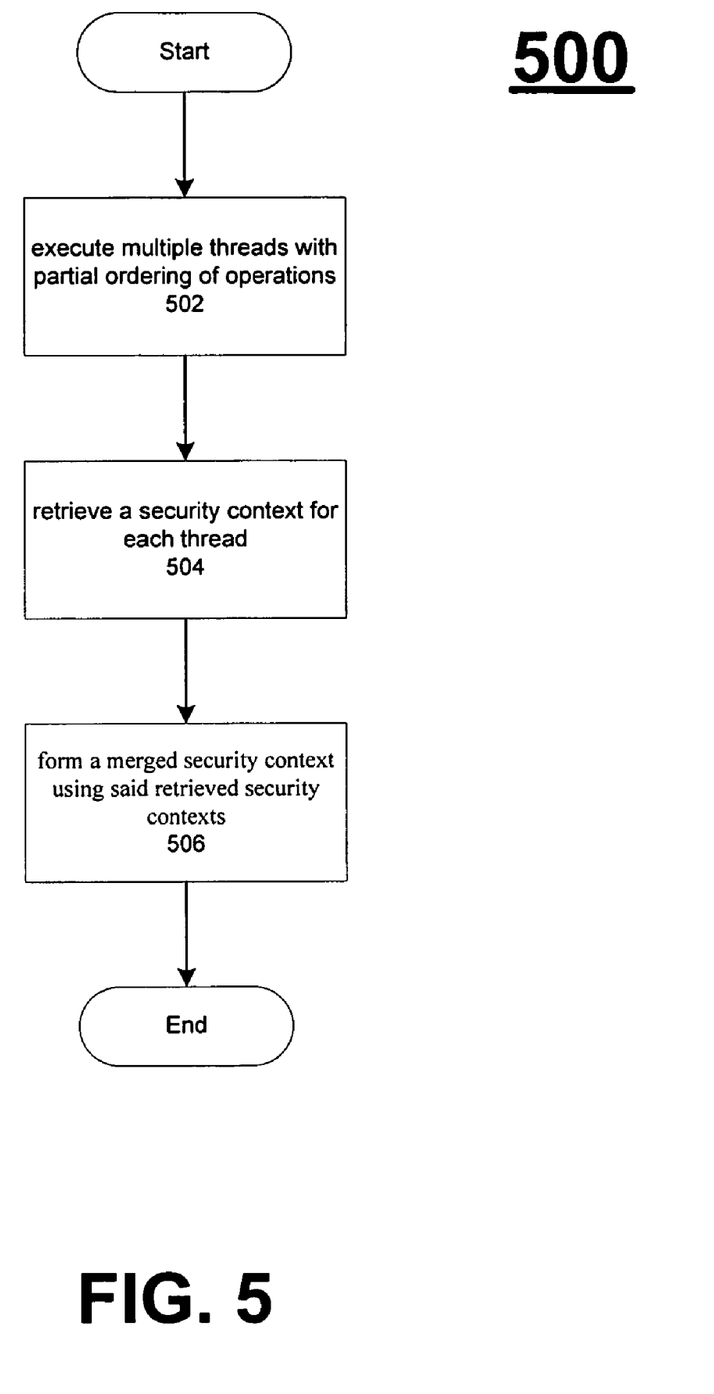
FIG. 5 illustrates an exemplary embodiment of logic flow.

FIG. 5 illustrates one embodiment of a logic flow 500. Logic flow 500 may be representative of the operations executed by one or more embodiments described herein, such as computing device 100 and/or security management module 112, for example. As shown in FIG. 5, multiple threads with partial ordering of operations may be executed at block 502. A security context may be retrieved for each thread at block 504. A merged security context may be formed using the retrieved security contexts at block 506.

In one embodiment, for example, a process token for each thread may be retrieved. A determination may be made that the process tokens represent a same process. A determination may be made that a thread token does not exist for each thread. The merged security context may be formed using one of the security contexts. The embodiments are not limited in this context.

In one embodiment, for example, a process token for each thread may be retrieved. A determination may be made that the process tokens represent a same process. A determination may be made that a thread token exists for each thread. The merged security context may be formed using one of the security contexts if the thread tokens represent a same entity and enabled groups. The embodiments are not limited in this context.

In one embodiment, for example, a process token for each thread may be retrieved. A determination may be made that the process tokens represent different processes. The merged security context may be formed using one of the security contexts if the process tokens represent a same entity and enabled groups. The embodiments are not limited in this context.

In one embodiment, for example, an input token having a set of permissions for each thread may be retrieved. A determination may be made that the input tokens represent a same entity. A merged security token may be formed with an intersection of the permissions from the input tokens. The embodiments are not limited in this context.

In one embodiment, for example, an input principal for each thread may be retrieved. A determination may be made that the input principals represent a same entity. The merged security context may be formed using the input principals. The embodiments are not limited in this context.

In one embodiment, for example, a stack of permissions for each thread may be retrieved. The merged security context may be formed using a union of the permissions for each thread. The embodiments are not limited in this context.

In one embodiment, for example, a determination as to whether the security contexts contain an assert stack modifier may be made. Stack permission information may be appended into a compressed stack if none of the security contexts contain an assert stack modifier. Alternatively, stack permission information positioned before the assert stack modifiers may be appended into a compressed stack if at least one of the security contexts contain an assert stack modifier. The embodiments are not limited in this context.

In one embodiment, for example, a determination may be made that the security contexts contain an assert stack modifier and one of the assert stack modifiers are less than full trust. In this case, stack permission information positioned before said assert stack modifiers may be appended in a compressed stack, followed by appending the less than full trust assert stack modifier and subsequent stack permission information into the compressed stack. The embodiments are not limited in this context.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

It is also worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, computing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An article of manufacture comprising:
a non-transitory machine-readable storage medium containing instructions that when executed enable a system to execute multiple concurrent threads with partial ordering of operations, retrieve a security context for each thread, and form a merged security context using said retrieved security contexts, wherein in said partial ordering of operations at least one operation depends on results from at least two other operations, said merged security context formed using an intersection of sets of permissions for each of said threads with said at least two other operations, said intersection of sets of permissions yielding permissions common to each set so as to properly flow and merge security contexts when synchronizing said results of said at least two other operations.

2. The article of claim 1, further comprising instructions that if executed enable the system to retrieve a process token for each thread, determine said process tokens represent a same process, determine a thread token does not exist for each thread, and form said merged security context using one of said security contexts.

3. The article of claim 1, further comprising instructions that if executed enable the system to retrieve a process token for each thread, determine said process tokens represent a same process, determine a thread token exists for each thread, and form said merged security context using one of said security contexts if said thread tokens represent a same entity and enabled groups.

4. The article of claim 1, further comprising instructions that if executed enable the system to retrieve a process token for each thread, determine said process tokens represent different processes, and form said merged security context using one of said security contexts if said process tokens represent a same entity and enabled groups.

5. The article of claim 1, further comprising instructions that if executed enable the system to retrieve an input token having said set of permissions for each thread, determine said input tokens represent a same entity, and form a merged security token with said intersection of said permissions from said input tokens.

6. The article of claim 1, further comprising instructions that if executed enable the system to retrieve an input principal for each thread, determine said input principals represent a same entity, and form said merged security context using said input principals.

7. The article of claim 1, further comprising instructions that if executed enable the system to determine whether said security contexts contain an assert stack modifier, append stack permission information into a compressed stack if none of said security contexts contain an assert stack modifier, and append stack permission information positioned before said assert stack modifiers into a compressed stack if at least one of said security contexts contain an assert stack modifier.

8. The article of claim 1, further comprising instructions that if executed enable the system to determine said security contexts contain an assert stack modifier, determine only one of said assert stack modifiers are less than full trust, and append stack permission information positioned before said assert stack modifiers followed by said less than full trust assert stack modifier and subsequent stack permission information into a compressed stack.

9. A method, comprising:
executing multiple concurrent threads by a processor with partial ordering of operations, wherein in said partial ordering of operations at least one operation depends on results from at least two other operations;
retrieving a security context for each thread; and
forming a merged security context using said retrieved security contexts, said merged security context formed using an intersection of sets of permissions for each of said threads with said at least two other operations, said intersection of sets of permissions yielding permissions common to each set so as to properly flow and merge security contexts when synchronizing said results of said at least two other operations.

10. The method of claim 9, comprising:
retrieving a process token for each thread;
determining said process tokens represent a same process;
determining a thread token does not exist for each thread; and
forming said merged security context using one of said security contexts.

11. The method of claim 9, comprising:
retrieving a process token for each thread;
determining said process tokens represent a same process;
determining a thread token exists for each thread; and
forming said merged security context using one of said security contexts if said thread tokens represent a same entity and enabled groups.

12. The method of claim 9, comprising:
retrieving a process token for each thread;
determining said process tokens represent different processes; and
forming said merged security context using one of said security contexts if said process tokens represent a same entity and enabled groups.

13. The method of claim 9, comprising:
retrieving an input token having said set of permissions for each thread;
determining said input tokens represent a same entity; and
forming a merged security token with said intersection of said permissions from said input tokens.

14. The method of claim 9, comprising:
determining whether said security contexts contain an assert stack modifier;
appending stack permission information into a compressed stack if none of said security contexts contain an assert stack modifier; and
appending stack permission information positioned before said assert stack modifiers into a compressed stack if at least one of said security contexts contain an assert stack modifier.

15. An apparatus, comprising:
a processor; and
a security management module to form a merged security context for multiple concurrent threads, with one of said threads depending on more than one preceding operation from other threads, said merged security context formed using an intersection of sets of permissions for each of said threads with said more than one preceding operation, said intersection of sets of permissions yielding permissions common to each set so as to properly flow and merge security contexts when synchronizing said results of said more than one preceding operation.

16. The apparatus of claim 15, each thread to have a security context formed using a security token, a managed security principal, or code-based permissions.

* * * * *